US010068420B2

(12) United States Patent
Yarbrough

(10) Patent No.: US 10,068,420 B2
(45) Date of Patent: Sep. 4, 2018

(54) SYSTEM AND METHOD FOR ENABLING A PLAYER PROXY TO EXECUTE A GAMING EVENT

(75) Inventor: Jon Yarbrough, Franklin, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 683 days.

(21) Appl. No.: 13/548,980

(22) Filed: Jul. 13, 2012

(65) Prior Publication Data

US 2014/0018143 A1 Jan. 16, 2014

(51) Int. Cl.
*A63F 13/00* (2014.01)
*G07F 17/32* (2006.01)

(52) U.S. Cl.
CPC .......... *G07F 17/323* (2013.01); *G07F 17/329* (2013.01); *G07F 17/3262* (2013.01); *G07F 17/3274* (2013.01)

(58) Field of Classification Search
CPC .. G07F 17/32; G07F 17/3223; G07F 17/3239; G07F 17/3272; G07F 17/38; A63F 2300/51; A63F 2300/513; A63F 2300/535; A63F 2300/5513; A63F 2300/60; A63F 2300/6054; A63F 2300/638; A63F 2300/80; A63F 2300/8011
USPC .......................................................... 463/42
See application file for complete search history.

(56) References Cited

U.S. PATENT DOCUMENTS 5,830,067 A * 11/1998 Graves et al. .................. 463/40
6,012,983 A 1/2000 Walker et al.
6,244,957 B1 6/2001 Walker et al.
6,306,038 B1 10/2001 Graves et al.
7,997,974 B2 8/2011 Walker et al.
2002/0183105 A1* 12/2002 Cannon .................. A63F 13/08 463/4
2003/0195043 A1 10/2003 Shinners et al.
2004/0043807 A1 3/2004 Pennington
2006/0052160 A1 3/2006 Saffari et al.
2007/0087820 A1 4/2007 Van Luchene
2008/0020848 A1 1/2008 Muir et al.
2012/0122590 A1* 5/2012 Nguyen .............. G07F 17/3253 463/42
2013/0053130 A1* 2/2013 Zielinski ............. G07F 17/3244 463/25
2013/0130766 A1* 5/2013 Harris .................. G07F 17/323 463/19

* cited by examiner

*Primary Examiner* — Tramar Harper
*Assistant Examiner* — Jeffrey Wong
(74) *Attorney, Agent, or Firm* — Armstrong Teasdale LLP

(57) ABSTRACT

A gaming system that includes a server and a first gaming machine communicatively coupled to the server, wherein the first gaming machine includes an input device configured to receive game play events from a first player operating the first gaming machine. The gaming system further includes one or more additional gaming machines communicatively coupled to the server, wherein each of the one or more additional gaming machines is operated by a respective player. The gaming system also includes a processor programmed to provide a game of chance on the first gaming machine, determine that a triggering event as occurred, and based on the triggering event, enable one of the one or more players on one of the one or more additional gaming machines to execute a game play event for the first player.

31 Claims, 4 Drawing Sheets

SYSTEM AND METHOD FOR ENABLING A PLAYER PROXY TO EXECUTE A GAMING EVENT

BACKGROUND OF THE INVENTION

The embodiments described herein relate generally to gaming machines and, more particularly, to systems and methods for enabling a player proxy to execute a game play event for another player.

To initiate a play of a game on a gaming machine, a player typically inserts a token/money/voucher into the gaming machine to establish credits on the gaming machine. The player then chooses the size of the bet and begins the game by pressing a physical button, pressing a particular part of a touch screen, or pulling a lever. If the game is a winner, a reward is given to the player in accordance with the outcome of the game, pay tables, and an amount wagered.

However, some games require a player to execute various actions throughout a play of the game. For example, in a classic bingo game, a player is required to place a wager, mark (e.g., daub) a bingo card as numbers are "called", recognize a winning pattern, and claim a prize. With a game like bingo, a time window may be allotted for a particular action (e.g., daubing) to be executed by the player. Thus, failure to execute the action within a predefined period of time resorts in the player forfeiting an ability to execute that particular action at that given time, which may also resort in the player forfeiting a prize. While a player may be reminded that an action is needed (e.g., an input button on the gaming machine may flash, or an on-screen message may pop up reminding the player to, for example, daub the bingo card), due to factors such as distractions, forgetfulness, slow reactions, and the like, many players still miss the window of opportunity to execute a particular action.

BRIEF DESCRIPTION OF THE INVENTION

In one aspect, a gaming system is provided. The gaming system including a server and a first gaming machine communicatively coupled to the server, wherein the first gaming machine includes an input device configured to receive game play events from a first player operating the first gaming machine. The gaming system further includes one or more additional gaming machines communicatively coupled to the server, wherein each of the one or more additional gaming machines is operated by a respective player. The gaming system also includes a processor programmed to provide a game of chance on the first gaming machine, determine that a triggering event as occurred, and based on the triggering event, enable one of the one or more players on one of the one or more additional gaming machines to execute a game play event for the first player.

In another aspect, a method for enabling a player proxy to execute a game play event is provided. The method including providing a game of chance to a first player on a first gaming machine, determining that a triggering event as occurred, and based on the triggering event, enabling a player on one of one or more additional gaming machines to execute a game play event for the first player.

In yet another aspect, one or more computer storage media embodying computer-executable instructions stored thereon for enabling a player proxy to execute a game play event for another player is provided. The instructions including the steps of providing a game of chance to a first player on a first gaming machine, determine that a triggering event as occurred, and based on the triggering event, enabling a player on one of one or more additional gaming machines to execute a game play event for the first player.

DETAILED DESCRIPTION OF THE INVENTION

Exemplary embodiments of systems and methods for use in enabling a player proxy to execute a game play event associated with a game of chance executed within a gaming system are described herein. Such embodiments allow a player proxy to execute a game play event for another player during play of a game of chance. The player proxy may be chosen, for example, at random, by the player, by the game server, or based on a response time of a plurality of potential player proxies. Further, the game play event may be a wager prior to a play of a game of chance, or the game play event may be an action to be executed during an actual play of the game of chance (e.g., after a wager has been received).

Exemplary technical effects of systems and methods described herein include at least one of: (a) providing a game of chance to a first player on a first gaming machine; (b) determining that a triggering event as occurred; and (c) based on the triggering event, enabling a player on one of one or more additional gaming machines to execute a game play event for the first player.

Figure 1:
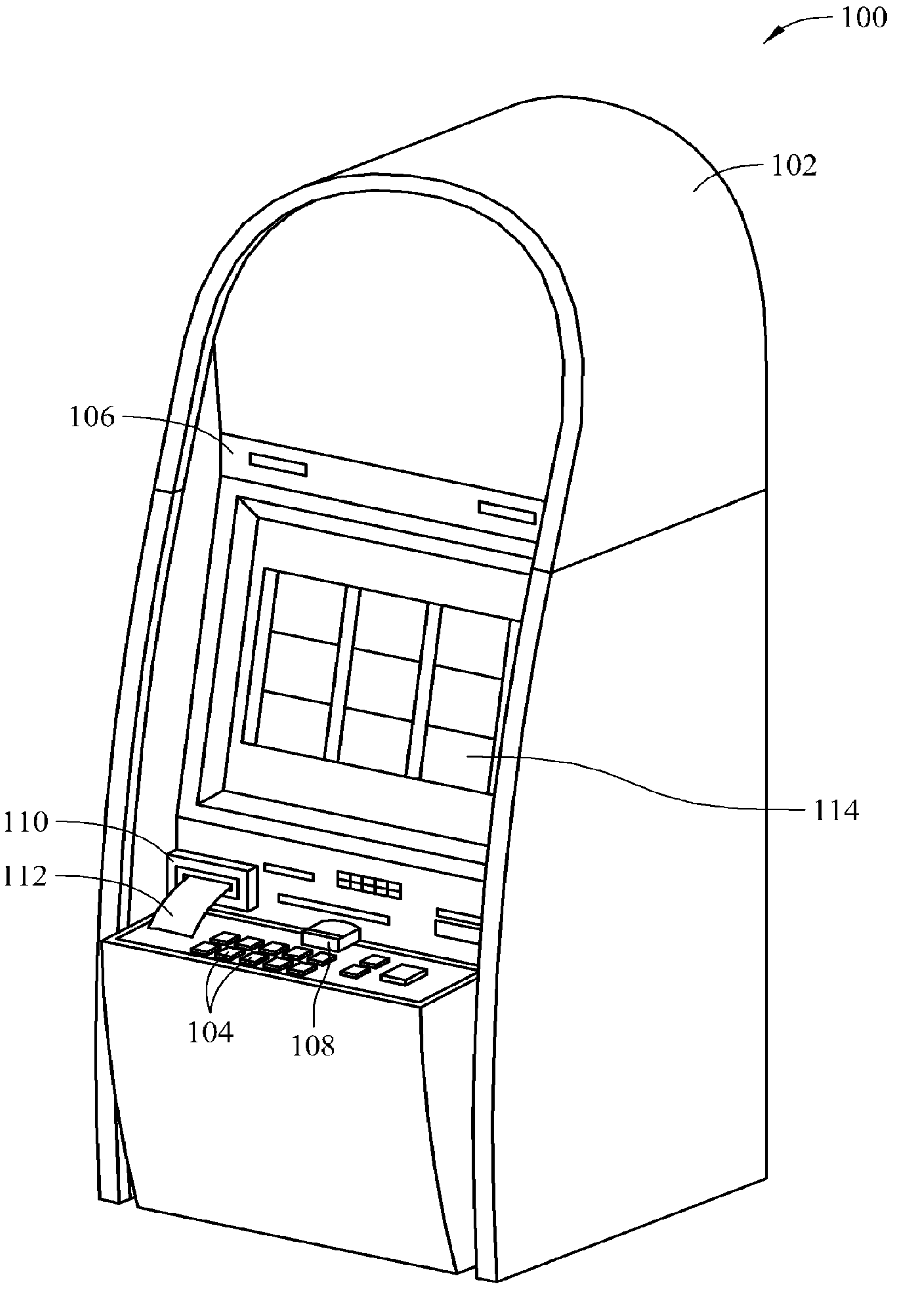
FIG. 1 is a schematic diagram of an exemplary gaming machine.

FIG. 1 is a schematic diagram of an exemplary gaming machine 100 that facilitates enabling a player proxy to execute a game play event for another player during a game of chance. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112.

Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game images, symbols, and/or indicia such as a visual representation or exhibition of movement of an object (e.g., a mechanical, virtual, or video reel), dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
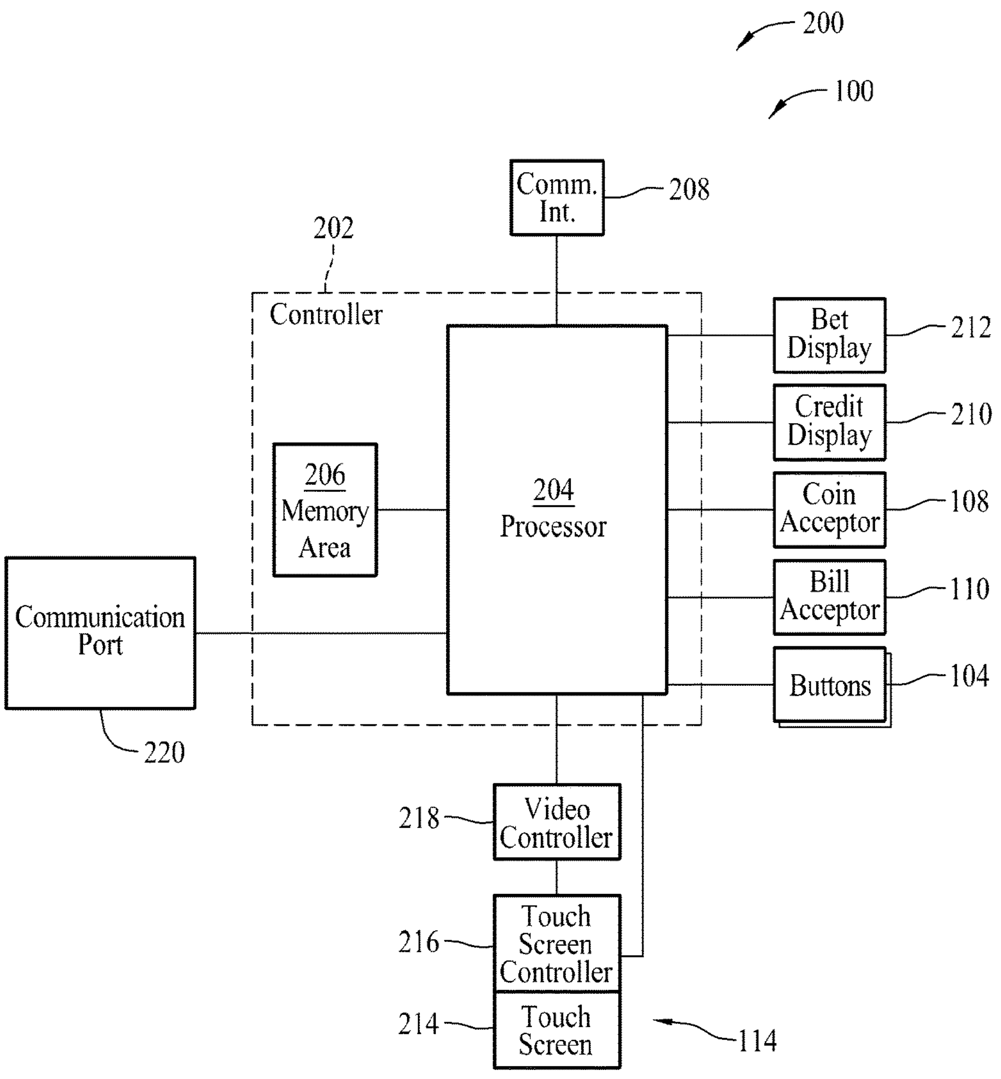
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled to a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Communication interface 208 may operate as an input device (e.g., by receiving data from another device) and/or as an output device (e.g., by transmitting data to another device). Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, trigger event conditions, game play events, a list of predefined periods of time to execute the game play events, game play outcomes, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination. In one embodiment, the above data and program code and instructions, executable by processor 204 for enabling a player proxy to execute a game play event may be stored and executed from a memory area remote from computing device gaming machine 100. For example, the data and the computer-executable instructions may be stored in a cloud service, a database, or other memory area accessible by gaming machine 100. Such embodiments reduce the computational and storage burden on gaming machine 100. As such, memory area 206 may be a local and/or a remote computer storage media including memory storage devices.

In the exemplary embodiment, gaming machine 100 includes a credit display 210, which displays a player's current number of credits, cash, account balance or the equivalent. Gaming machine 100 also includes a bet display 212, which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. In such embodiments, presentation device 114 may operate as an input device in addition to presenting information. A video controller 218 is communicatively coupled to controller 202 and touch screen controller 216 to enable a player to input game play decisions (e.g., actions) into gaming machine 100 via touch screen 214. Furthermore, gaming machine 100 includes one or more communication ports 220 that enable controller 202 to communicate with external peripheral devices (not shown) such as, but not limited to, external video sources, expansion buses, other displays, a SCSI port, or a key pad.

Figure 3:
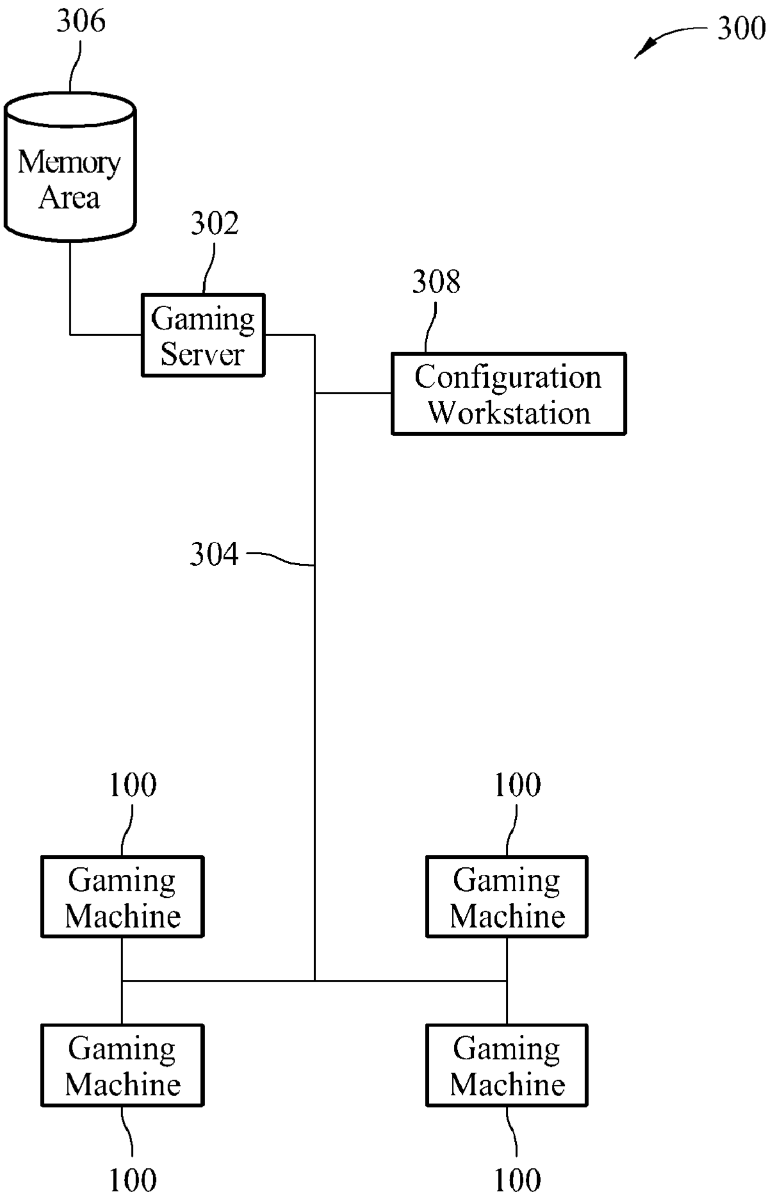
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 (shown in FIG. 2) to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

In one embodiment, one or more gaming machines 100 may be remote gaming machines that access a casino over network 304. As such, a player is able to participate in a game of chance on a remote gaming machine while a player proxy is physically present at, for example, a casino or some other location. In this embodiment, it will be understood that a player operating a remote gaming machine has virtual access to any casino coupled to network 304 and associated with gaming server 302. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance, remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 302. In such an embodiment, gaming machines 100 display results of a game via presentation device 114 (shown in FIGS. 1 and 2).

In one embodiment, gaming server 302 performs a plurality of functions including, for example, game outcome generation, executing a game play event for a player, player proxy selection, player tracking functions, and/or accounting functions, to name a few. However, in alternative embodiments, gaming system 300 may include a plurality of servers that separately perform these functions and/or any suitable function for use in a network-based gaming system.

In some embodiments, gaming server 302 provides a game of chance to a player operating one of gaming machines 100. As explained above, a time window (e.g., predefined period of time) may be allotted for a particular action in the game of chance to be executed by the player and a failure to execute the action within the predefined period of time resorts in the player forfeiting an ability to execute that particular action at that given time. However, embodiments of the present disclosure enable gaming server 302 to send a request to a player proxy to execute a game play event for the player after the predefined period of time of inactivity has elapsed in the game of chance. Thus, even though a player may have distractions, forgetfulness, slow reactions, and the like, embodiments of the present disclosure enable the predefined period of time to execute a particular action to not be missed.

Thus, in one embodiment, a predefined period of time (e.g., seconds, minutes, or a combination thereof) is a triggering event. The predefined period of time may begin at a point where an "action" is executable by a player. For example, a predefined period of time may begin once a ball is called in a bingo game, since the action of a player marking or "daubing" a particular square on a bingo card is executable once the ball is called. Therefore, when one or more balls are called, a player may have a predefined period of time (e.g., ten seconds) to daub a particular square on a bingo card until gaming server 302 enables a player proxy to daub the particular square for the player.

In another embodiment, a predefined period of time may be one or more missed game play events. For example, gaming server 302 may enable a player proxy to execute a game play event after a predefined number of game play events have been missed by the player. Alternatively, gaming server 302 may act as a player proxy by automatically executing a game play event for the player after, for example, a predefined period of time of inactivity.

In further embodiments, a predefined period of time may not be required. For example, an execution of a game play event by a player proxy may be based one or more of the following triggering events: a wager, a daub, and/or a prize claim action taken by any player (e.g., a player daubing his or her own card).

In yet another embodiment, a predefined period of time may not be required, and a triggering event for a player proxy action is generated automatically by gaming server 302 or by one of gaming machine 100. For example, a completion of each ball call event at game server 302 may serve as a triggering event to initiate a player proxy action for all players in the game. Gaming server 302 may broadcast a command over network 304 and initiate the player proxy process. Alternatively, after each ball call, gaming machine 100 may automatically start the player proxy process to execute the game play event at another of gaming machines 100. Further, an agreement accepted by a player to utilize a player proxy may constitute a triggering event. This agreement may be presented to a player prior to or after an initiation of a game of chance.

A typical game play cycle for a bingo game implemented on gaming machines 100 will now be described with reference to FIG. 3. Initially, a player requests to place a wager on a game of chance. Thereafter, gaming server 302 accesses a directory, brief description, and a schedule of all available games from memory area 306 and sends the information to the player. In one embodiment, choosing an amount wagered per chance/bingo card and/or how a proxy for the player is selected during the game of chance is predefined by, for example, gaming server 302. However, once the player has selected a game of chance (e.g., a bingo game), and prior to a start of the bingo game, gaming server 302 may also query the player as to a preference on these strategic decisions. For example, gaming server 302 may determine an amount a player wants to wager per chance/bingo card and/or how a player proxy for the player is to be selected. As such, this information may be stored in memory area 306 and used to limit the necessary player interaction during a play of a game of chance.

When a time before a start of a particular bingo game is less than a preset time, gaming server 302 notifies each player that the game is closed. When the bingo game begins, gaming server 302 accepts a ball drawing result after a ball is called. Once an identification of the ball is established, gaming server 302 correlates the identification of the ball with each player's bingo card(s). If, upon receipt of a triggering event (e.g., after a predefined period of time a player does not mark or "daub" all of his cards in play), gaming server 302 enables a player proxy to daub the cards for the player by selecting an appropriate input on the gaming machine operated by the player proxy. In one embodiment, the player proxy may be chosen at random by gaming server 302, by the player, or based on a response time of a plurality of potential proxies (e.g., a first player to respond is the player proxy request). Next, gaming server 302 checks to see if any of the bingo cards or chances have fulfilled the criteria for a prize. If the criteria for a prize have been fulfilled, the winning card is displayed and a corresponding player acknowledges ownership in the winning card by selecting an appropriate input on the gaming machine operated by the player.

In addition, gaming server 302 may also track data of players using gaming machines 100. For example, gaming server 302 can store physical characteristics of players, such as, but not limited to, a gender of a player and an age of a player. Gaming server 302 can also track and store other data related to the players using player tracking identification, such as a player card. For example, gaming server 302 can store information about a player, such as loyalty points, player address, phone number, and/or any information that may be retrieved and transmitted to gaming machines 100. In some embodiments, gaming server 302 stores and tracks information such as, but not limited to, an average amount of a wager played at gaming machines 100, any funds a player may have in an account, as well as data relating to reportable events.

Figure 4:
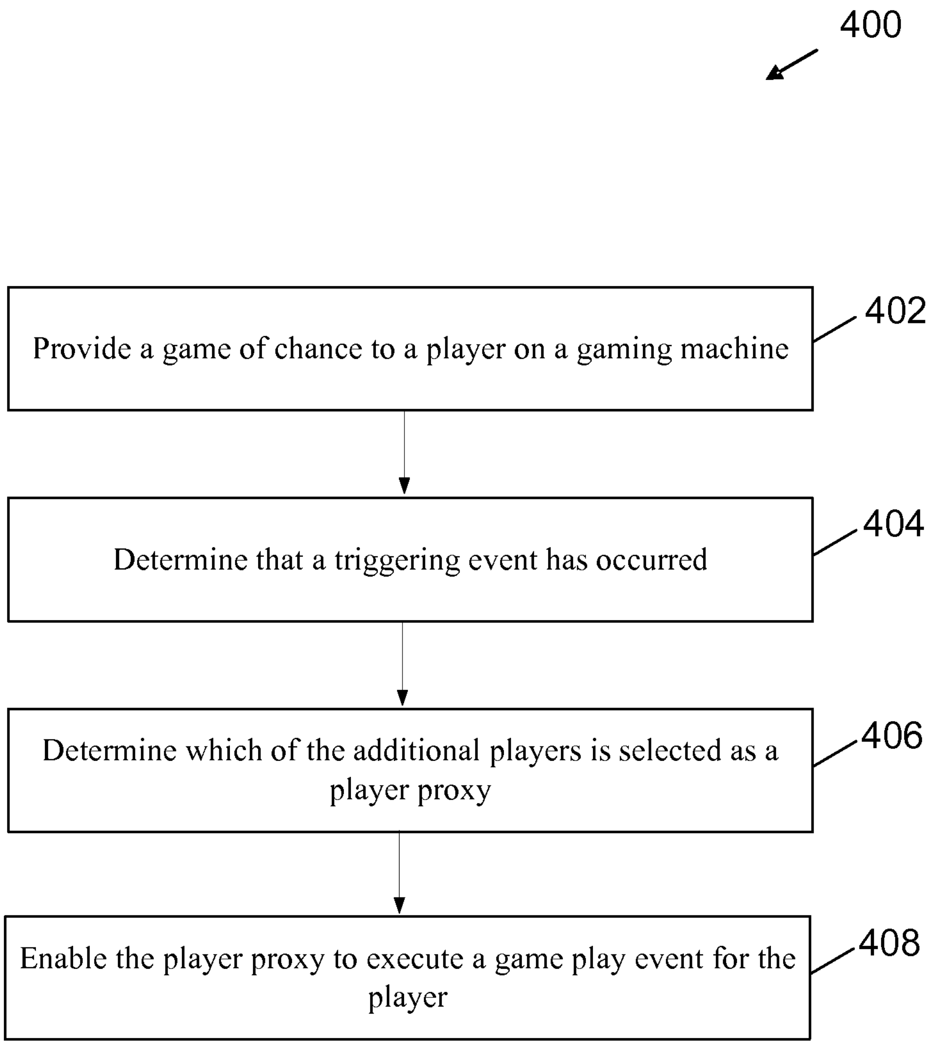
FIG. 4 is a flowchart that illustrates an exemplary method for enabling a player proxy to execute a game play event.

With reference now to FIG. 4, a flowchart that illustrates an exemplary method 400 for use with gaming system 300 (shown in FIG. 3) is provided. Operations in method 400 may be performed by one or more gaming machines 100, by gaming server 302, and/or by any other computing device or combination thereof. In exemplary embodiments, and referring to FIGS. 2, 3, and 4, a game of chance is provided to a player on a gaming machine (e.g., one of gaming machines 100) at 402. At D, a triggering event is determined to have occurred. As mentioned above, a triggering event may be one or more of the following: an elapsed predefined period of time of inactivity by the player, a wager, a daub, a prize claim. In some implementations, when a predefined period of time is not required, the first action (wager, daub, or claim) taken by any player in the game may serve as the triggering event, or the game server may automatically generate a triggering event at a predefined game state, such as, at the end of each ball call.

Once the triggering event occurs, a request to execute a game play event for the player is sent to one or more additional players (e.g., possible player proxies). In one embodiment, a predefined period of time may be allotted for a particular action (e.g., daubing a card in bingo) to be executed and a failure to execute the action within the predefined period of time enables another player (e.g., a player proxy) to execute the action (e.g., game play event) for the player. For example, during a bingo game, when a ball inscribed with a certain number is called, gaming server 302 may send an instruction to a player operating gaming machine 100 as to which position on a bingo card to mark or "daub". These daubing instructions may be communicated in terms of a position on a bingo card (e.g., each square on a bingo card is given a daub identification number from one to twenty-five). The daubing identification number is then sent to communication interface 208 to display on presentation device 114 of gaming machine 100. In further embodiments, a triggering event may be a receipt of a request by an additional player to execute a game play event for the player.

At 406, a determination is made as to which of the additional players is selected as a player proxy. In one embodiment, based on a triggering event, the request to execute a game play event for the player is sent to each player playing the game of chance (e.g., a bingo game). Gaming server 302 may determine the player proxy by identifying which of the plurality of additional players is first to execute the request. In another embodiment, the player proxy may be pre-defined/selected either by gaming server 302 or by the player prior to initiating the game of chance.

At 408, gaming server 302 enables the player proxy to execute a game play event for the player. In some embodiments, the game play event is associated with a wager, for example, a wager to initiate an additional game of chance or a request to change a wager to a particular amount. In addition, a game play event may be associated with acknowledging an outcome of the game of chance (e.g., acknowledging a "bingo" has occurred). In one embodiment, gaming server 302 receives the game play event via an input device (e.g., a button 104 or touch screen 214) on gaming machine 100 associated with the player proxy. In addition, or alternatively, gaming server 302 may receive the game play event from gaming machine 100 associated with the player proxy via a communication interface, such as communication interface 208.

In one embodiment, after the player proxy executes the game play event for the player, gaming server 302 disables an ability of player proxy to execute an additional game play event for the player until an additional predefined period of time of inactivity by the player has elapsed. Thus, in this embodiment, a predefined period of time must elapse each time prior to player proxy having authorization to execute a game play event for the player. In another embodiment, gaming server 302 enables an ability of player proxy to execute all game play events for the player until a request from the player to execute a game play event himself, or a player proxy revocation request by the player, or a termination signal of the game play session, is received.

One of ordinary skill in the art, guided by the teaching herein will appreciate that one or more operations in method 400 may be performed repeatedly. For example, game play events may be received repeatedly, and at least a portion of the steps described above may be performed based on each game play event.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming system comprising:

a first gaming machine, comprising:

at least one of a coin acceptor, a bill validator, a card reader, and a ticket reader for establishing a first credit balance, for a first player, from which a first wager is accepted for admitting the first player to a game of chance; and a first input device configured to facilitate execution of game play events by the first player;

a second gaming machine, comprising:

at least one of a coin acceptor, a bill validator, a card reader, and a ticket reader for establishing a second credit balance, for a second player, from which a second wager is accepted for admitting the second player to the game of chance; and a second input device configured to facilitate execution of game play events by the second player; and a processor programmed to:

conduct the game of chance on the first gaming machine and the second gaming machine;

determine that a triggering event as occurred, wherein the triggering event comprises an elapsed predefined period of time of inactivity on the game of chance; and enable the first player to execute a game play event for the first gaming machine and the second gaming machine in response to a request by the first player to execute the game play event from the first gaming machine upon occurrence of the triggering event.

2. A gaming system in accordance with claim 1, wherein the first gaming machine is remote from the second gaming machine.

3. A gaming system in accordance with claim 1, wherein the processor is further programmed to send a request from the second gaming machine to respective players of at least one gaming machine, including the first gaming machine, to execute a game play event for the second player after the triggering event.

4. A gaming system in accordance with claim 3, wherein the processor is further programmed to determine an earliest of the respective players of the at least one gaming machine to accept the request to execute the game play event for the second player; and wherein the first player of the first gaming machine is the earliest of the respective players.

5. A gaming system in accordance with claim 1, wherein the triggering event is a receipt of a request from the second gaming machine to execute the game play event for the second player through the first gaming machine.

6. A gaming system in accordance with claim 1, wherein the triggering event is an execution of any game action, by any player in the game of chance, determined to arrive earliest at the processor.

7. A gaming system in accordance with claim 1, wherein the game of chance is a bingo game comprising a bingo card, and wherein the triggering event is the completion of a ball call.

8. A gaming system in accordance with claim 1, wherein the processor is further programmed to disable an ability of the first player to execute an additional game play event for the second player until an additional triggering event has occurred.

9. A gaming system in accordance with claim 1, wherein the game play event is a wager.

10. A gaming system in accordance with claim 1, wherein the game play event is an event during the game of chance after receipt of a wager to initiate the game of chance.

11. A gaming system in accordance with claim 1, wherein the game of chance is a bingo game comprising a bingo card, and wherein the game play event is daubing the bingo card.

12. A gaming system in accordance with claim 1, wherein the game of chance is a bingo game comprising a bingo card, and wherein the game play event comprises a wager and daubing the bingo card.

13. A gaming system in accordance with claim 1, wherein the game of chance is a bingo game comprising a bingo card, and wherein the game play event comprises a wager, daubing the bingo card, and a claim.

14. A gaming system in accordance with claim 1, wherein the processor is further programmed to receive the executed game play event for the second gaming machine from the first gaming machine.

15. A method for enabling a player proxy to execute a game play event for another player, the method comprising:

establishing a first credit balance for a first player using at least one of a coin acceptor, a bill validator, a card reader, and a ticket reader for a first gaming machine;

accepting a first wager for the first player from the first credit balance for admission to a game of chance;

establishing a second credit balance for a second player using at least one of a coin acceptor, a bill validator, a card reader, and a ticket reader for a second gaming machine;

accepting a second wager for the second player from the second credit balance for admission to the game of chance;

conducting the game of chance on the first gaming machine and the second gaming machine;

determining that a triggering event has occurred, wherein the triggering event comprises an elapsed predefined period of time of inactivity in the game of chance;

sending a request to respective players of a plurality of gaming machines, including the first player of the first gaming machine, to execute a game play event for the second player of the second gaming machine after the triggering event; and enabling the first player to execute the game play event for the first gaming machine and the second gaming machine in response to a request by the first player to execute the game play event from the first gaming machine upon occurrence of the triggering event.

16. A method in accordance with claim 15, wherein the first gaming machine is remote from the second gaming machine.

17. A method in accordance with claim 15, further comprising:

determining an earliest of the respective players to accept the request to execute the game play event for the second player; and wherein the earliest of the respective players is the first player.

18. A method in accordance with claim 15, wherein the triggering event is a receipt of a request from the second gaming machine to execute the game play event for the second player through the first gaming machine.

19. A method in accordance with claim 15, wherein the game of chance is a bingo game comprising a bingo card, and wherein the game play event is daubing the bingo card.

20. A method in accordance with claim 15, wherein the game of chance is a bingo game comprising a bingo card, and wherein the game play event comprises a wager and daubing the bingo card.

21. A method in accordance with claim 15, wherein the game of chance is a bingo game comprising a bingo card, and wherein the game play event comprises a wager, daubing the bingo card, and a claim.

22. A method in accordance in accordance with claim 15, wherein the triggering event is an earliest execution of any game action, by any player in the game of chance.

23. A method in accordance with claim 15, wherein the game of chance is a bingo game comprising a bingo card, and wherein the triggering event is completion of a ball call.

24. A method in accordance with claim 15 further comprising receiving the executed game play event for the second gaming machine from the first gaming machine.

25. One or more computer storage media embodying computer-executable instructions stored thereon for enabling a player proxy to execute a game play event for another player, the instructions comprising the steps of:

establishing a first credit balance for a first player using at least one of a coin acceptor, a bill validator, a card reader, and a ticket reader for a first gaming machine;

accepting a first wager for the first player from the first credit balance for admission to a game of chance;

establishing a second credit balance for a second player using at least one of a coin acceptor, a bill validator, a card reader, and a ticket reader for a second gaming machine;

accepting a second wager for the second player from the second credit balance for admission to the game of chance;

conducting the game of chance on the first gaming machine and the second gaming machine;

determining that a triggering event as occurred, wherein the triggering event comprises an elapsed predefined period of time of inactivity in the game of chance;

sending a request to respective players of a plurality of gaming machines, including the first player of the first gaming machine, to execute a game play event for the second player after the triggering event;

enabling the first player to execute the game play event for the second gaming machine in response to a request by the first player to execute the game play event from the first gaming machine upon occurrence of the triggering event.

26. The computer storage media of claim 25, wherein the instructions further comprise the steps of determining an earliest player of the respective players to accept the request to execute the game play event for the second player; and wherein the earliest player is the first player.

27. The computer storage media of claim 25, wherein the triggering event is a receipt of a request by the second player on the second gaming machine to execute the game play event for the second player through the first gaming machine.

28. The computer storage media of claim 25, wherein the game of chance is a bingo game comprising a bingo card, and wherein the game play event is one or more of the following:

a wager;

daubing the bingo card; and a claim.

29. The computer storage media of claim 25, wherein the triggering event is an earliest execution of any game action, by any player in the game of chance.

30. The computer storage media of claim 25, wherein the game of chance is a bingo game comprising a bingo card, and wherein the triggering event is completion of a ball call.

31. The computer storage media of claim 25, wherein the instructions further comprise receiving the executed game play event for the second gaming machine from the first gaming machine.

* * * * *